(12) United States Patent
Tsubokura et al.

(10) Patent No.: US 7,889,287 B2
(45) Date of Patent: Feb. 15, 2011

(54) DISPLAY DEVICE WITH FIRST AND SECOND ELASTIC SPACERS EXTENDING IN PARALLEL ON OPPOSITE SURFACES OF A DISPLAY PANEL AND HAVING DIFFERENT HARDNESS AT CORRESPONDING LOCATIONS

(75) Inventors: Masaki Tsubokura, Mobara (JP); Yasuharu Yatsu, Mobara (JP); Tatsuyuki Fumikura, Mobara (JP); Yoshiteru Tomizuka, Ooamishirasato (JP)

(73) Assignees: Hitachi Displays, Ltd., Chiba-Ken (JP); Hitachi Display Devices, Ltd., Chiba-Ken (JP)

( * ) Notice: Subject to any disclaimer, the term of this patent is extended or adjusted under 35 U.S.C. 154(b) by 269 days.

(21) Appl. No.: 12/124,605

(22) Filed: May 21, 2008

(65) Prior Publication Data
US 2008/0225199 A1 Sep. 18, 2008

Related U.S. Application Data

(62) Division of application No. 10/942,934, filed on Sep. 17, 2004, now Pat. No. 7,379,128.

(30) Foreign Application Priority Data
Sep. 17, 2003 (JP) .............................. 2003-324181

(51) Int. Cl.
*G02F 1/1333* (2006.01)

(52) U.S. Cl. .......................................... 349/60; 349/58

(58) Field of Classification Search ................... 349/12, 349/58, 60; 348/836
See application file for complete search history.

(56) References Cited

U.S. PATENT DOCUMENTS

| 5,808,707 | A | 9/1998 | Niibori |
| 5,929,950 | A | 7/1999 | Matsuda |
| 5,946,062 | A | 8/1999 | Hasegawa |
| 6,064,453 | A | 5/2000 | Inubushi |
| 6,411,353 | B1 | 6/2002 | Yarita |
| 6,545,733 | B2 * | 4/2003 | Kaga et al. ...................... 349/58 |
| 6,734,928 | B2 * | 5/2004 | Ito et al. ......................... 349/58 |
| 6,909,475 | B2 | 6/2005 | Kojima |
| 2005/0185110 | A1 * | 8/2005 | Lai et al. ....................... 349/58 |

FOREIGN PATENT DOCUMENTS

| JP | 04-055822 | 2/1992 |
| JP | 07-244274 | 9/1995 |
| JP | 08-179288 | 7/1996 |
| JP | 09-022000 | 1/1997 |
| JP | 11-024024 | 1/1999 |

* cited by examiner

*Primary Examiner*—David Nelms
*Assistant Examiner*—Nathanael R Briggs
(74) *Attorney, Agent, or Firm*—Antonelli, Terry, Stout & Kraus, LLP.

(57) ABSTRACT

A display device includes a display panel, a frame, an elastic spacer arranged on a peripheral portion of the display panel in parallel to the edge of the display panel, the elastic spacer being arranged between the display panel and the frame. A hardness of the elastic spacer varies along the length-side direction of the elastic spacer.

5 Claims, 6 Drawing Sheets

DISPLAY DEVICE WITH FIRST AND SECOND ELASTIC SPACERS EXTENDING IN PARALLEL ON OPPOSITE SURFACES OF A DISPLAY PANEL AND HAVING DIFFERENT HARDNESS AT CORRESPONDING LOCATIONS

CROSS REFERENCE TO RELATED APPLICATION

This application is a divisional application of U.S. application Ser. No. 10/942,934, filed Sep. 17, 2004, now U.S. Pat. No. 7,379,128, the contents of which are incorporated herein by reference.

BACKGROUND OF THE INVENTION

The present invention relates to a display device; and, more particularly, to a technique for effecting support for a display panel in a display device so as to reduce warping of the display panel.

A display device, such as a liquid crystal display device, includes a liquid crystal display panel for displaying an image. The liquid crystal display panel is formed of a pair of substrates, such as glass sheets, that are disposed so as to mutually oppose each other via liquid crystal, with numerous pixels being disposed in the spreading direction of the liquid crystal.

A pair of electrodes is disposed in each pixel of the liquid crystal display panel, and the light transmissivity of the liquid crystal of the pixels is controlled by an electric field generated between these electrodes. For this reason, a light source is necessary in order to perceive an image on the liquid crystal display panel. Ordinarily, a backlight is disposed at the back surface of the liquid crystal display panel, so that the light from the backlight passes through the pixels of the liquid crystal display device and reaches the observer.

Moreover, the liquid crystal display panel, the backlight and other members are modulized using several frames, whereby the position of the backlight or the other members with respect to the liquid crystal display panel is regulated, as described for example in JP-A-9-22000. Thus, it is unavoidable for the liquid crystal display panel to include places that come into contact with the frames at portions thereof. Spacers (elastic spacers) comprising an elastic agent, such as rubber, are located at these portions to suppress mechanical stress with respect to the liquid crystal display panel.

SUMMARY OF THE INVENTION

However, it has become apparent that, in a liquid crystal display panel configured in this manner, warping of the liquid crystal display panel occurs and that irregularities in the image display arise due to this warping.

As a result of pursuing the cause of this problem, it has been discovered that the problem results from the elastic frames interposed between the liquid crystal display panel and the support frames, and it has become apparent from this that, when the force from the support frames is transmitted to the liquid crystal display panel, warping occurs in the liquid crystal display panel, because the force is not uniform. It was also discovered that this warping is a problem shared in common with display devices that include a panel and support frames.

The present invention was devised on the basis of these observations, and it has the object of achieving a reduction in the warping of a display panel.

Representative Examples of the invention disclosed in the present application are as follows.

(1) A display device has a display panel, a frame, and an elastic spacer arranged on a peripheral portion of the display panel in parallel to the edge of the display panel. The elastic spacer is arranged between the display panel and the frame, and the hardness of the elastic spacer varies along the length-side direction of the elastic spacer.

(2) A display device has a display panel, a first frame and a second frame, a first elastic spacer and a second elastic spacer arranged on the peripheral of the display panel in parallel to the edge of the display panel; and the first elastic spacer is arranged between the display panel and the first frame, and the second elastic spacer is arranged between the display panel and the second frame. The hardness of at least one of the first elastic spacer and the second elastic spacer varies along the length-side direction of the elastic spacer.

(3) In a display device based on Example (2), the hardness of the first elastic spacer varies along the length-side direction of the elastic spacer, and the second elastic spacer is arranged to correspond in location to the first elastic spacer. The hardness of the first portion of the second spacer which correspond in location to a high-hardness portion of the first elastic spacer is low, and the hardness of a second portion of the second spacer which corresponds in location to a low-hardness portion of the first elastic spacer is high.

(4) In a display device based on Example (1), the elastic spacer having a center portion and an edge portion along the length-side direction, and the hardness of the center portion and that of the edge portion are different.

(5) in a display device based on Example (2), at least one of the first elastic spacer and the second elastic spacer has a center portion and an edge portion along the length-side direction, and the hardness of the center portion and that of the edge portion are different.

(6) In a display device based on Example (3), the first elastic spacer and the second elastic spacer having a center portion and an edge portion along the length-side direction, and the hardness of the center portion and that of the edge portion are different.

(7) A display device based on Example (1), wherein the change in the hardness of the elastic spacer is gradual.

(8) A display device based on Example (1), wherein the elastic spacer is arranged at plural edges of the panel.

(9) A display device based on Example (2), wherein the hardness of the first elastic spacer and that of the second elastic spacer is substantially equal at a corner portion of the panel.

(10) A display device has a display panel, a frame, an elastic spacer arranged on a peripheral portion of the display panel in parallel to the edge of the display panel; and the elastic spacer is arranged between the display panel and the frame. The width of the elastic spacer varies along the length-side direction of the elastic spacer.

(11) A display device has a display panel, a first frame and a second frame, a first elastic spacer and a second elastic spacer arranged on a peripheral portion of the display panel in parallel to the edge of the display panel; and the first elastic spacer is arranged between the display panel and the first frame, while the second elastic spacer is arranged between the display panel and the second frame. The width of at least one of the first elastic spacer and the second elastic spacer varies along the length-side direction of the elastic spacer.

(12) A display device based on Example (11), wherein the width of the first elastic spacer varies along the length-side direction of the elastic spacer, and the second elastic spacer is arranged to correspond in location to the first elastic spacer.

The width of a first portion of the second spacer which corresponds in location to a wide portion of the first elastic spacer is narrow, and the width of a second portion of the second spacer which corresponds in location to a narrow portion of the first elastic spacer is wide.

(13) A display device based on Example (10), wherein the elastic spacer has a center portion and an edge portion along the length-side direction, and the width of the center portion and that of the edge portion are different.

(14) A display device based on Example (11), wherein at least one of the first elastic spacer and the second elastic spacer has a comprising center portion and an edge portion along the length-side direction, and the width of the center portion and the width of the edge portion are different.

(15) A display device based on Example (12), wherein the first elastic spacer and the second elastic spacer has a center portion and an edge portion along the length-side direction, and the width of the center portion and the width of the edge portion are different.

(16) A display device based on Example (10), wherein the change of width of the elastic spacer is gradual.

(17) A display device based on Example (10), wherein the elastic spacer is arranged at plural edges of the panel.

(18) A display device based on Example (11), wherein the width of the first elastic spacer and the width of the second elastic spacer are substantially equal at a corner portion of the panel.

In a liquid crystal display device configured in this manner, by varying the hardness of the spacers in the longitudinal direction thereof, as indicated in the configuration of Example (1), the transmission of a force from the frames to the liquid crystal display panel can be controlled, whereby the force on the display panel can be made uniform and warping of the liquid crystal display panel can be significantly reduced.

FIG. 3 is a characteristic diagram relating to a case where rubber is selected as the material of the elastic spacers and which shows the relationship of the width w of the spacer and a deformation amount δ thereof with respect to pressure F in a case where the hardness of the rubber is 20. If the hardness is different, the characteristics change, but the characteristics shown in FIG. 3 are shifted almost substantially linearly. Namely, when the hardness of the spacers is low, it becomes that much easier for them to deform, and, due to that deformation, it becomes easier to avoid warping resulting from a force on the liquid crystal display panel from the frames.

In this case, in light of the fact that the force transmitted from the frames to the liquid crystal display panel is different at one side portion of the liquid crystal display panel between the center portion thereof and both sides, it is apparent that an enormous effect is exhibited by tripartitioning the elastic spacers in the longitudinal direction thereof and varying the hardness between the center and both sides.

Also, changing the width of the elastic spacers as a means to vary the hardness along the longitudinal direction thereof has the effect that the elastic spacers become extremely easy to manufacture.

DETAILED DESCRIPTION OF THE INVENTION

Various embodiments of a display device according to the present invention will be described with reference to the drawings.

Each display device will be described by way of example with reference to a liquid crystal panel. Of course, the display device may also be an organic EL or inorganic EL panel, or a PDP or FED.

First, in a display device using a liquid crystal display panel, it is common to sandwich the liquid crystal display panel and a backlight disposed at the back surface of the liquid crystal panel display between an upper frame disposed at the front surface of the liquid crystal display panel and a lower frame disposed at the rear surface of the backlight, to thereby modulize these elements.

Additionally, in order for the liquid crystal display panel to be disposed at a constant position with respect to the backlight, the liquid crystal display panel is placed integrally with the backlight, or on a mold frame that is positioned and formed with respect to the backlight, so that movement in the x direction and the y direction thereof is regulated.

Here, the liquid crystal display panel includes, for example, a pair of glass substrates that are disposed so as to oppose each other via liquid crystal, with numerous pixels being formed in the spreading direction of the liquid crystal. The liquid crystal display panel is placed on the frames, and materials having elasticity, such as rubber spacers, are disposed therebetween.

Figure 2A:
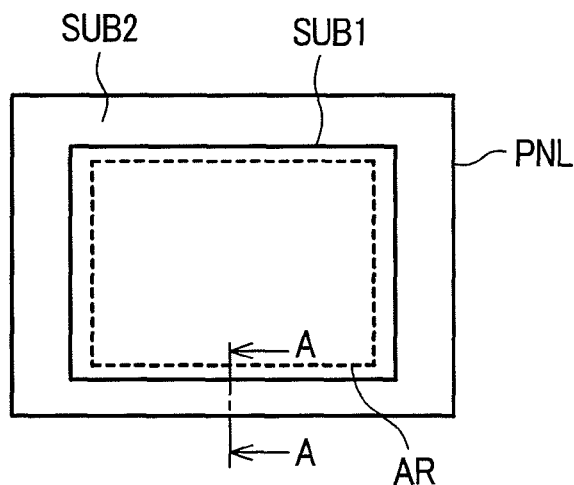
FIG. 2A is a plan view showing the configuration of a display device according to the invention, where the device is modulized by incorporating a display panel.

FIG. 2A is a diagram showing a plan view of a liquid crystal display panel PNL. A substrate SUB1 disposed on the front and a substrate SUB2 disposed on the back of the display panel PNL are shown. The reason the substrate SUB1 disposed on the front is formed to be smaller than the substrate SUB2 disposed on the back is because a liquid crystal display drive circuit (not shown) comprising a semiconductor device is disposed at the peripheral side portion of the substrate SUB2 that is exposed from the substrate SUB1.

In the liquid crystal display panel PNL configured in this manner, the central portion of the substrate SUB1, excluding a slight peripheral portion, serves as an effective display region AR where numerous pixels are disposed in a matrix array.

For this reason, as described above, an opening (display window) is formed in the portion of the upper frame disposed on the front surface of the liquid crystal display panel PNL opposing the effective display region AR. An observer is able to perceive, through this display window, an image produced on the effective display region AR of the liquid crystal display panel PNL.

Figure 2B:
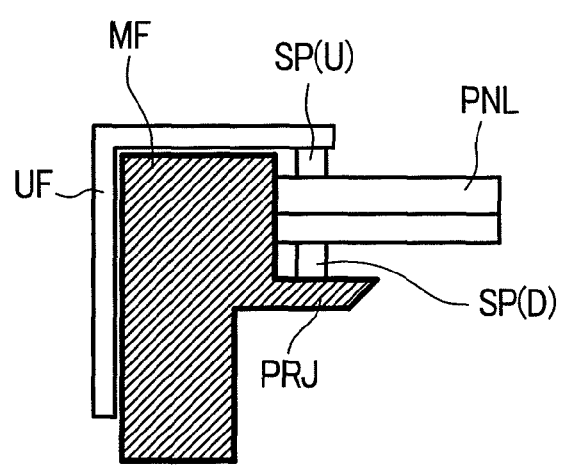
FIG. 2B is a cross-section taken along line A-A of FIG. 2A.
Figure 3:
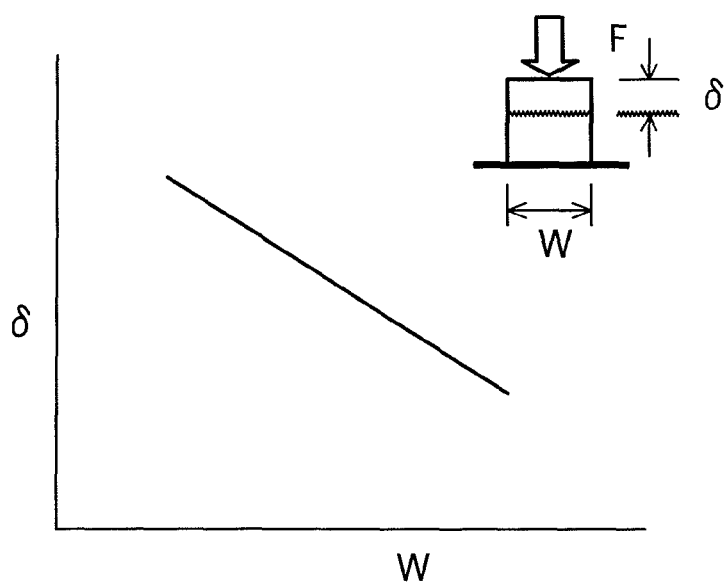
FIG. 3 is a characteristic diagram showing the relation between width and deformation amount with respect to the pressure on the spacers used in the display device according to the invention.

FIG. 2B is a diagram showing a partial cross-sectional view of the liquid crystal display panel PNL. Reference designation MF represents a mold frame MF that is integrally formed with a frame body of the backlight or is formed separately from the backlight, but is positioned with respect to the backlight.

The liquid crystal display panel PNL is disposed so that the periphery thereof is supported on a projecting portion PRJ that projects inward of the mold frame MF, and a spacer SP(D) configured by, for example, rubber is disposed therebetween. The spacer SP(D) is used for alleviating mechanical stress applied to the liquid crystal display panel PNL, which is formed using glass as an external member.

For the same reason, a spacer SP(U) configured by, for example, rubber is disposed between the liquid crystal display panel PNL and an upper frame UF, which is disposed on the front surface of the liquid crystal display panel PNL. The spacer SP(U) alleviates mechanical stress resulting from direct contact of the upper frame UF with the liquid crystal display panel PNL.

Because the display opening is disposed in the portion of the upper frame UF opposing the effective display region AR of the liquid crystal display panel PNL, as mentioned above, the upper frame UF is depicted in the drawing as extending somewhat from the mold frame MF side to the liquid crystal display panel PNL side. Additionally, the upper frame UF is depicted as extending downward in the drawing so as to cover the side surface of the outer side of the mold frame MF. This is because the upper frame UF is joined to an unillustrated lower frame by, for example, caulking.

Here, the spacer SP(D) disposed between the mold frame MF and the liquid crystal display panel PNL and the spacer SP(U) disposed between the upper frame UF and the liquid crystal display panel PNL both form rectangular ring patterns so as to surround the effective display region AR of the liquid crystal display panel PNL. This is because the projecting portion PRJ of the mold frame MF is formed so as to support the entire periphery of the liquid crystal display panel PNL, and the upper frame UF is disposed so as to cover the entire periphery of the liquid crystal display panel PNL.

However, this does not mean that the spacers SP are invariably only integral rings. It is common for the spacers SP to be separated at appropriate places by relatively small distances. In order to eliminate the cumbersomeness of manufacture, it is common, for example, for four linear spacers to be used so as to oppose each other at each side of the rectangular effective display region AR of the liquid crystal display panel PNL.

Additionally, each spacer SP is partitioned into, for example, three portions in the longitudinal direction thereof, and each spacer SP is formed so that the hardness of the rubber is lower at the partitioned center portion thereof and is higher at both sides. In other words, each spacer SP is formed so that the hardness of the rubber is less at the center portion thereof than at both sides.

Alternatively, each spacer SP may be formed so that, with respect to the portions tripartitioned in the longitudinal direction, as described above, the hardness of the rubber is higher at the center portion thereof and lower at both side portions. In other words, each spacer SP may be formed so that the hardness of the rubber is greater at the center portion thereof than at both sides.

It should be noted that it is not necessary for the change in the hardness of the spacers to be sudden. The change in the hardness may be gradual from the portion(s) at which the hardness is high to the portion(s) at which the hardness is low.

First Embodiment

Figure 1A:
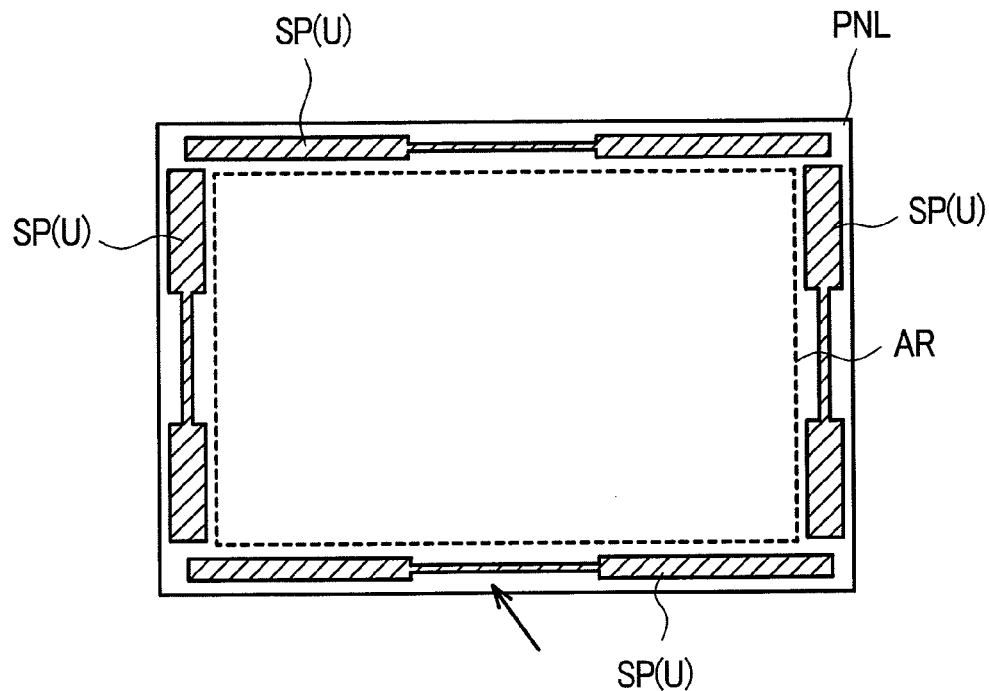
FIGS. 1A and 1B are diagrams showing an embodiment of the spacers used in a display device according to the present invention.
Figure 1B:
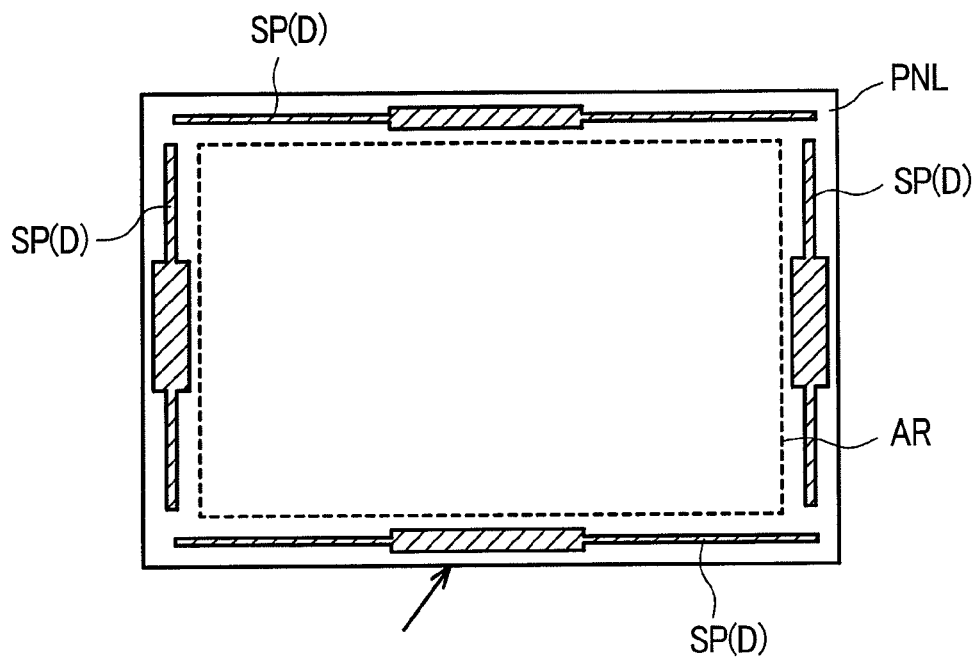

FIGS. 1A and 1B are diagrams showing an embodiment of the spacers SP. FIG. 1A shows the spacers SP(U) that are positioned between the liquid crystal display panel PNL and the upper frame UF, and FIG. 1B shows the spacers SP(D) that are positioned between the liquid crystal display panel PNL and the mold frame MF. In both FIGS. 1A and 1B, the spacers are depicted so as to illustrate their positional relations with respect to the liquid crystal display panel PNL.

The spacers SP(U) that are positioned between the liquid crystal display panel PNL and the upper frame UF are disposed between the outer contour of the liquid crystal display panel PNL and the outer contour of the effective display region AR thereof, and, as seen in FIG. 1A, there are four spacers that extend linearly along each side of the effective display region AR.

Additionally, each of the spacers SP(U) is tripartitioned along the longitudinal direction thereof, with the center portion thereof (e.g., the portion indicated by the arrow in the drawing) being narrowly formed and both side portions being more widely formed. Thus, the spacers SP(U) are configured so that the hardness of each spacer SP(U) is greater at the corners of the liquid crystal display panel PNL and at portions close thereto, and so that the hardness of each spacer SP(U) is less at the other portions, i.e., at the centers of each side of the liquid crystal display panel PNL and at portions close thereto.

Also, the spacers SP(D) that are positioned between the liquid crystal display panel PNL and the mold frame MF are similarly disposed between the outer contour of the liquid crystal display panel PNL and the outer contour of the effective display region AR thereof, and, as seen in FIG. 1B, there are four spacers that extend linearly along each side of the effective display region AR.

Additionally, each of the spacers SP(D) is tripartitioned along the longitudinal direction thereof, with the center portion thereof (e.g., the portion indicated by the arrow in the drawing) being more widely formed and both side portions being narrowly formed. Thus, the spacers SP(D) are configured so that the hardness of each spacer SP(D) is less at the corners of the liquid crystal display panel PNL and at portions close thereto, and so that the hardness of each spacer SP(D) is greater at the other portions, i.e., at the centers of each side of the liquid crystal display panel PNL and at portions close thereto.

In the above-described embodiment, the structural features which produce the effects of the present invention are administered to both the spacers SP(U) positioned between the liquid crystal display panel PNL and the upper frame UF and to the spacers SP(D) positioned between the liquid crystal display panel PNL and the mold frame MF; however, the wideness of the spacers of one of the groups of spacers SP(U) and SP(D) may be made constant (thus, either wide or narrow) so that the effects of the present invention are exhibited by only the spacers of the other of the groups of spacers SP(U) and SP(D).

Second Embodiment

Figure 4A:
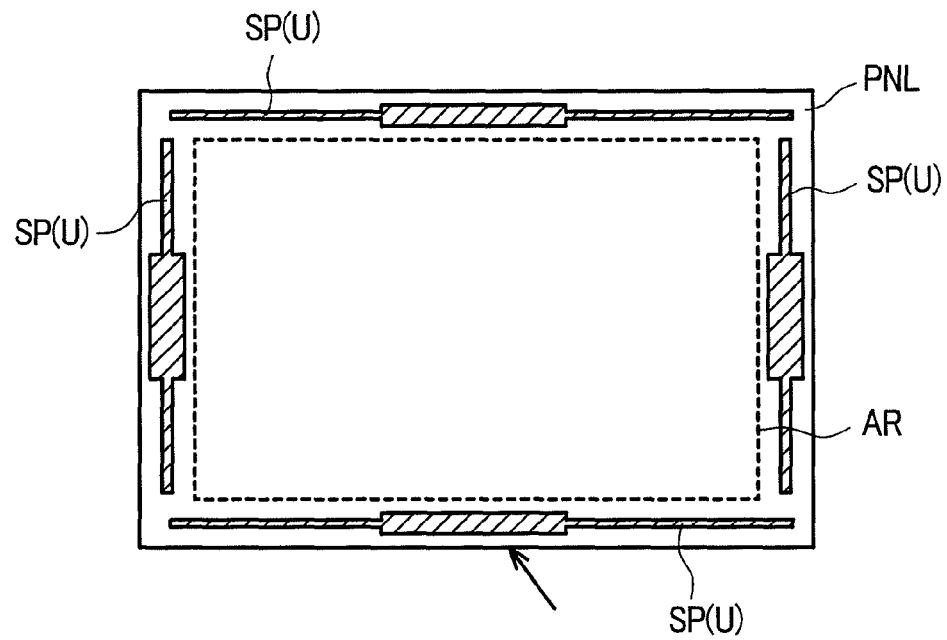
FIGS. 4A and 4B are diagrams showing another embodiment of the spacers used in the display device according to the invention.
Figure 4B:
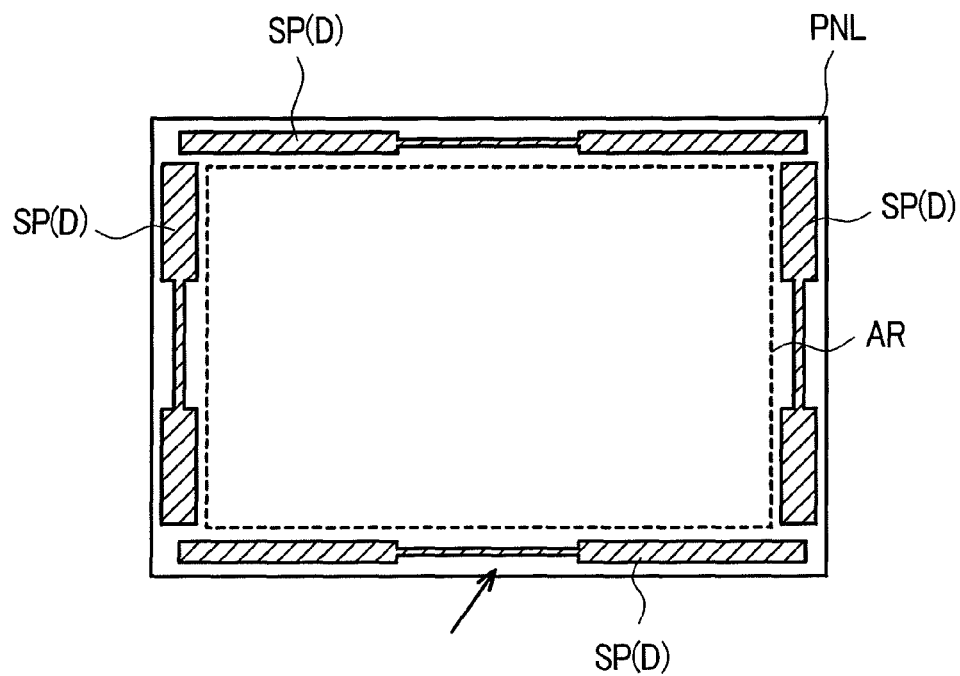

FIGS. 4A and 4B are diagrams showing another embodiment of the spacers SP. FIG. 4A shows the spacers SP(U) that are positioned between the liquid crystal display panel PNL and the upper frame UF, and FIG. 4B shows the spacers SP(D) that are positioned between the liquid crystal display panel PNL and the mold frame MF. In both FIGS. 4A and 4B, the spacers are depicted so as to illustrate their positional relations with respect to the liquid crystal display panel PNL.

The spacers SP(U) positioned between the liquid crystal display panel PNL and the upper frame UF are disposed between the outer contour of the liquid crystal display panel PNL and the outer contour of the effective display region AR thereof, and, as seen in FIG. 4A, there are four spacers that extend linearly along each side of the effective display region AR.

Additionally, each of the spacers SP(U) is tripartitioned along the longitudinal direction thereof, with the center portion thereof (e.g., the portion indicated by the arrow in the drawing) being widely formed and both side portions being narrowly formed. Thus, the spacers SP(U) are configured so that the hardness of each spacer SP(U) is less at the corners of the liquid crystal display panel PNL and at portions close thereto, and so that the hardness of each spacer SP(U) is greater at the other portions, i.e., at the centers of each side of the liquid crystal display panel PNL and at portions close thereto.

Also, the spacers SP(D) positioned between the liquid crystal display panel PNL and the mold frame MF are similarly disposed between the outer contour of the liquid crystal display panel PNL and the outer contour of the effective display region AR thereof, and, as shown in FIG. 4B, there are four spacers that extend linearly along each side of the effective display region AR.

Additionally, each of the spacers SP(D) is tripartitioned along the longitudinal direction thereof, with the center portion thereof (e.g., the portion indicated by the arrow in the drawing) being narrowly formed and both side portions being formed. Thus, the spacers SP(D) are configured so that the hardness of each spacer SP(D) is greater at the corners of the liquid crystal display panel PNL and at portions close thereto, and so that the hardness of each spacer SP(D) is less at the other portions, i.e., at the centers of each side of the liquid crystal display panel PNL and at portions close thereto.

In the above-described embodiment, the structural features which produce the effects of the present invention are administered to both the spacers SP(U) positioned between the liquid crystal display panel PNL and the upper frame UF and to the spacers SP(D) positioned between the liquid crystal display panel PNL and the mold frame MF; however, the wideness of the spacers of one of the groups of spacers SP(U) and SP(D) may be made constant (thus, either wide or narrow) so that the effects of the present invention are exhibited by only the spacers of the other of the groups of spacers SP(U) and SP(D).

Third Embodiment

Figure 5:
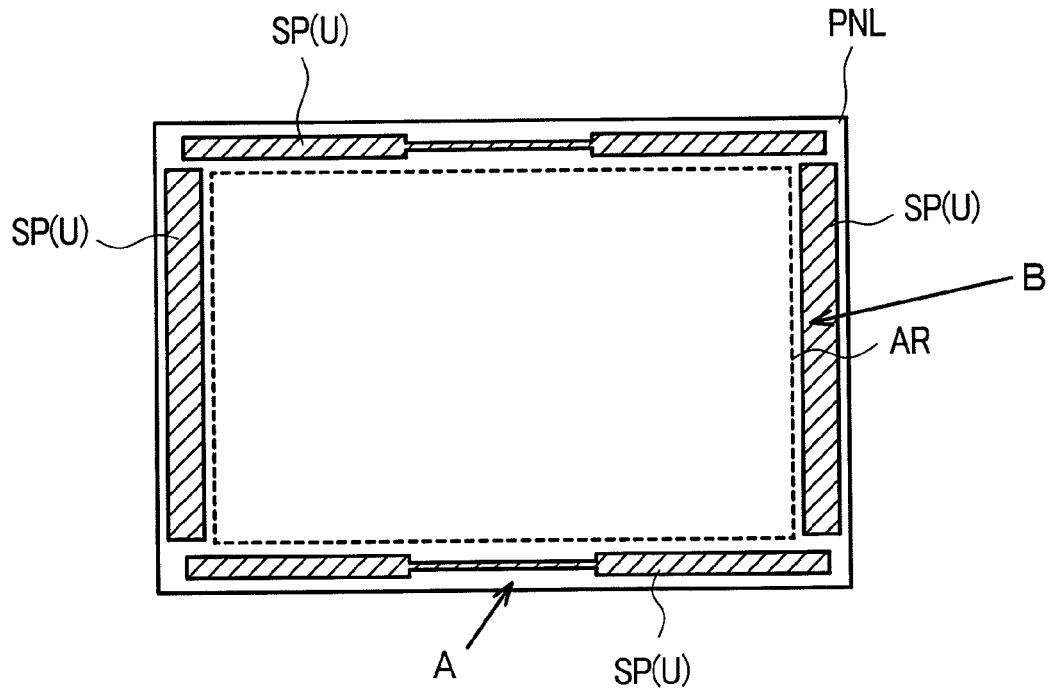
FIG. 5 is a diagram showing another embodiment of the spacers used in the display device according to the invention.

FIG. 5 is a diagram showing another embodiment of the spacers SP, for example, the spacers SP(U) that are positioned between the liquid crystal display panel PNL and the upper frame UF. The spacers SP(U) positioned between the liquid crystal display panel PNL and the upper frame UF are disposed between the outer contour of the liquid crystal display panel PNL and the outer contour of the effective display region AR thereof, and, as seen in FIG. 5, there are four spacers that extend linearly along each side of the effective display region AR.

Of these, each spacer of the pair of spacers SP positioned at portions corresponding to the longer sides of the effective display region AR is tripartitioned along the longitudinal direction thereof, with the center portion thereof (e.g., the portion indicated by arrow A in the drawing) being narrowly formed and both side portions being widely formed. Also, each of the pair of spacers (e.g., indicated by arrow B in the drawing) positioned at portions corresponding to the shorter sides of the effective display region AR is widely formed, with the width being constant in the longitudinal direction.

Although not illustrated, the spacers SP(D) that are positioned between the liquid crystal display panel PNL and the mold frame MF may also be configured similar to what is shown in FIGS. 1 and 4, wherein the wideness/narrowness is reversed with respect to the spacers SP(U) shown in FIG. 5 that are positioned between the liquid crystal display panel PNL and the upper frame UF.

Also, even if the spacers SP are not configured in this manner, the width of the spacers SP(D) positioned between the liquid crystal display panel PNL and the mold frame MF may be made constant (thus, either wide or narrow) so that the effects of the present invention are exhibited by only the spacers SP(U) are positioned between the liquid crystal display panel PNL and the upper frame UF. Moreover, this relation may be reversed between the spacers SP(U) positioned between the liquid crystal display panel PNL and the upper frame UF and the spacers SP(D) positioned between the liquid crystal display panel PNL and the mold frame MF.

Fourth Embodiment

Figure 6:
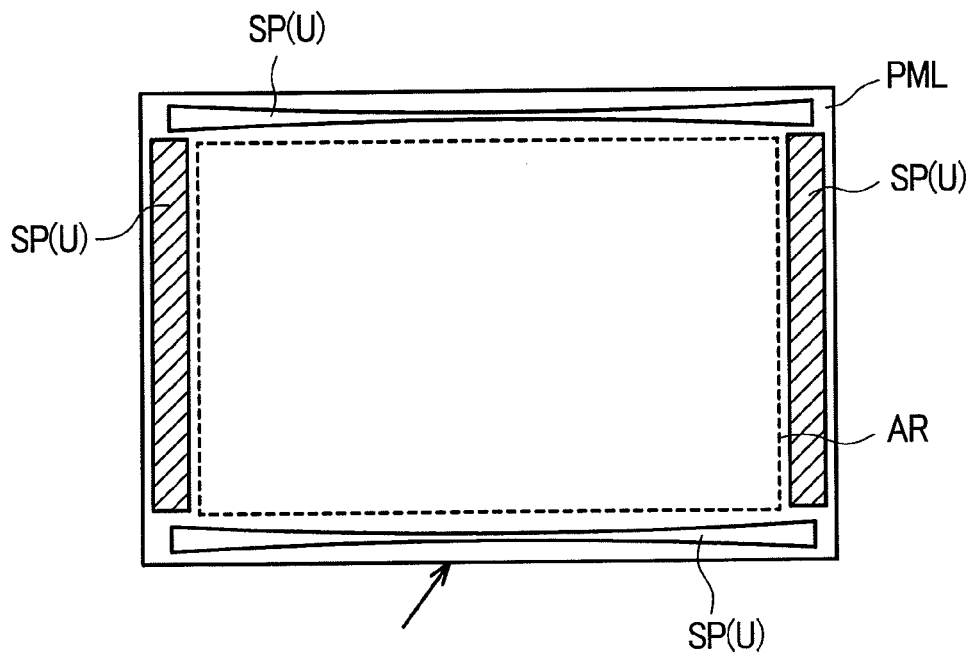
FIG. 6 is a diagram showing another embodiment of the spacers used in the display device according to the invention.

FIG. 6 is a diagram showing another embodiment of the spacers SP, for example, the spacers SP(U) that are positioned between the liquid crystal display panel PNL and the upper frame UF.

The spacers SP(U) positioned between the liquid crystal display panel PNL and the upper frame UF are disposed between the outer contour of the liquid crystal display panel PNL and the outer contour of the effective display region AR thereof, and, as shown in FIG. 6, there are four spacers that extend linearly along each side of the effective display region AR.

Of these, each spacer of the pair of spacers SP positioned at portions corresponding to the longer sides of the effective display region AR is tripartitioned along the longitudinal direction thereof, with the center portion thereof (e.g., the portion indicated by the arrow in the drawing) being narrowly formed and both side portions being widely formed. However, there is no sudden change in the width; rather, these spacers are formed so that they gradually become thinner from the wide portions and gradually become width from the thin portions. Also, each of the pair of spacers SP positioned at portions corresponding to the shorter sides of the effective display region AR is widely formed, with the width being constant in the longitudinal direction.

Although not illustrated, the spacers SP(D) positioned between the liquid crystal display panel PNL and the mold frame MF may also be configured similar to what is shown in FIGS. 1 and 4, wherein the wideness/narrowness is reversed with respect to the spacers SP(U) shown in FIG. 6 that are positioned between the liquid crystal display panel PNL and the upper frame UF.

Also, even if the spacers SP are not configured in this manner, the width of the spacers SP(D) positioned between the liquid crystal display panel PNL and the mold frame MF may be made constant (thus, either wide or narrow) so that the effects of the present invention are exhibited by only the spacers SP(U) positioned between the liquid crystal display panel PNL and the upper frame UF. Moreover, this relation may be reversed between the spacers SP(U) positioned between the liquid crystal display panel PNL and the upper frame UF and the spacers SP(D) positioned between the liquid crystal display panel PNL and the mold frame MF.

Fifth Embodiment

Figure 7:
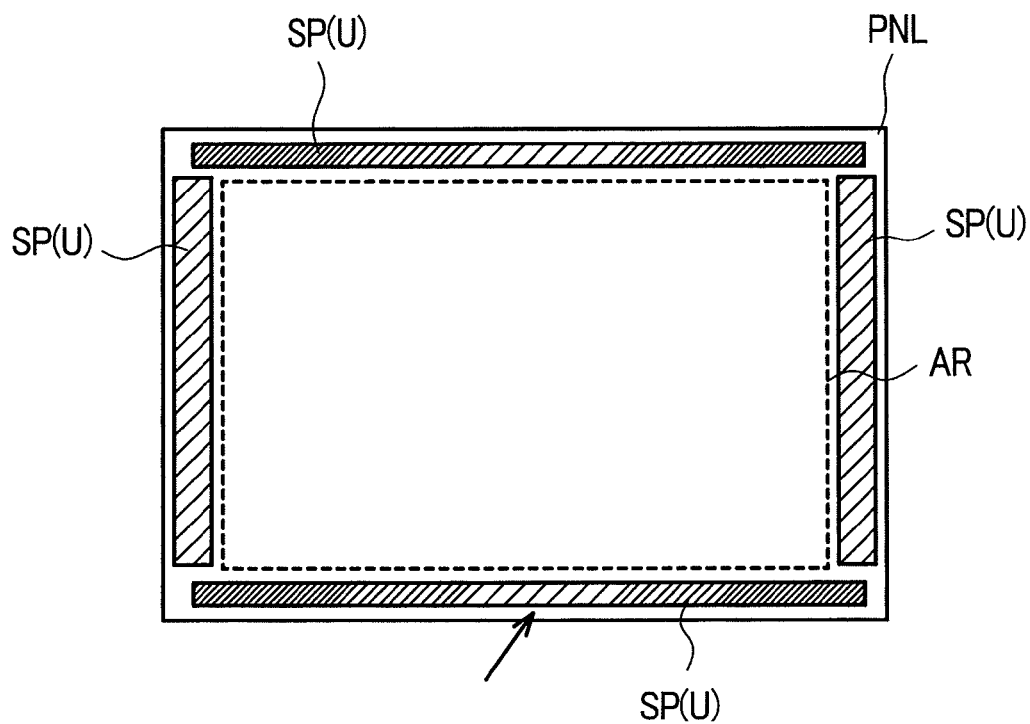
FIG. 7 is a diagram showing another embodiment of the spacers used in the display device according to the invention.

FIG. 7 is a diagram showing another embodiment of the spacers SP, for example, the spacers SP(U) that are positioned between the liquid crystal display panel PNL and the upper frame UF.

The spacers SP(U) positioned between the liquid crystal display panel PNL and the upper frame UF are disposed between the outer contour of the liquid crystal display panel PNL and the outer contour of the effective display region AR thereof, and, as shown in FIG. 7 there are four spacers that extend linearly along each side of the effective display region AR. The spacers are configured so as to be relatively wide, with a line width that is constant.

Of these, each spacer of the pair of spacers SP positioned at portions corresponding to the longer sides of the effective display region AR is tripartitioned along the longitudinal direction thereof, with the center portion thereof (e.g., the portion indicated by the arrow in the drawing) being formed with a high hardness and both side portions being formed with a low hardness. However, there is no sudden change in the level of the hardness; rather, these spacers are formed so that the hardness gradually becomes lower from the portions whose hardness is high and gradually becomes higher from the portions whose hardness is low. Also, each of the pair of spacers SP positioned at portions corresponding to the shorter sides of the effective display region AR is formed with a relatively low hardness, with there being no change in the hardness in the longitudinal direction thereof.

Although not illustrated, the spacers SP(U) positioned between the liquid crystal display panel PNL and the mold frame MF may also be configured similar to what is shown in FIGS. 1 and 4, the level of hardness is reversed with respect to the spacers SP(U) shown in FIG. 7 that are positioned between the liquid crystal display panel PNL and the upper frame UF.

Also, even if the spacers SP are not configured in this manner, the hardness of the spacers SP(D) positioned between the liquid crystal display panel PNL and the mold frame MF may be made constant, so that the effects of the present invention are exhibited by only the spacers SP(U) positioned between the liquid crystal display panel PNL and the upper frame UF. Moreover, this relation may be reversed between the spacers SP(U) positioned between the liquid crystal display panel PNL and the upper frame UF and the spacers SP(D) positioned between the liquid crystal display panel PNL and the mold frame MF.

Sixth Embodiment

Figure 8A:
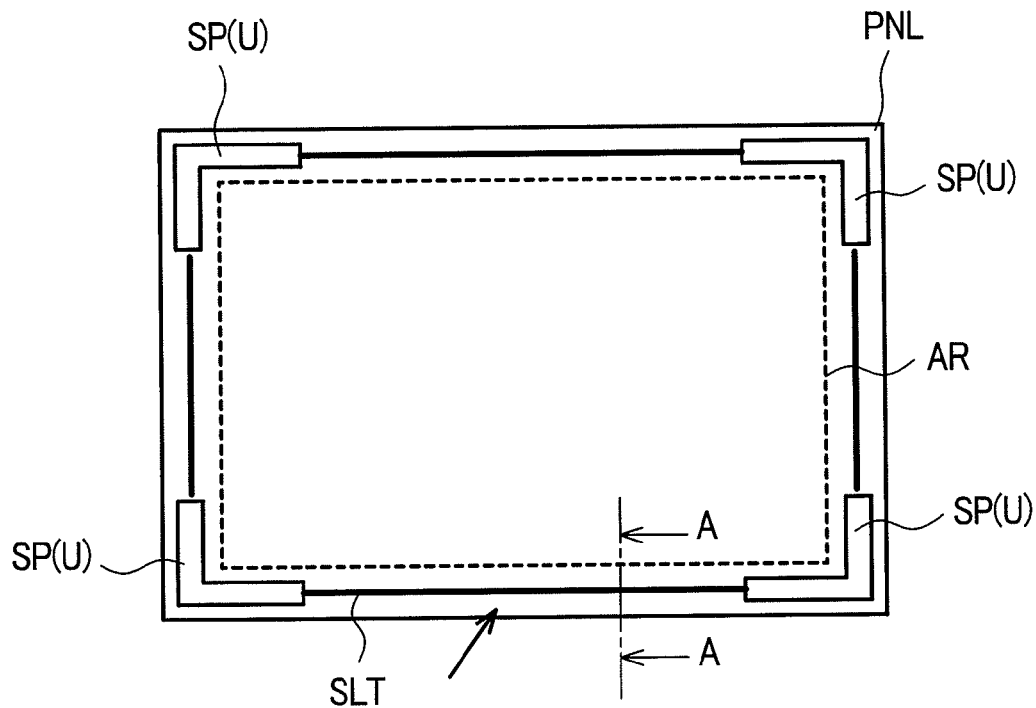
FIG. 8A is a diagram showing other spacers used in the display device according to the invention.

FIG. 8A is a diagram showing another embodiment of the spacers SP, for example, the spacers SP(U) that are positioned between the liquid crystal display panel PNL and the upper frame UF.

The spacers SP(U) positioned between the liquid crystal display panel PNL and the upper frame UF are disposed between the outer contour of the liquid crystal display panel PNL and the outer contour of the effective display region AR thereof, and they are formed along orthogonal sides that form angles at the corner portions of the effective display region AR.

The spacers SP do not extend as far as substantially the center portions of each side configuring the outer contour of the effective display region AR of the liquid crystal display panel PNL. Thus, the present embodiment has a configuration where the spacers SP are not disposed at these portions. The spacers SP are disposed at each of the corner portions of the effective display region; for this reason, four spacers are disposed. The spacers are configured by relatively wide spacers whose line width is constant.

That is, the spacers SP are not provided at the locations where the relatively narrow portions of the spacers SP are provided in each of the preceding embodiments. In this case, an equal force is transmitted to the liquid crystal display panel PNL because it is easy for the force from the frames to be dispersed at the portions where there are no spacers SP.

It should be noted that a light-shielding tape SLT is disposed at the places (e.g., the places indicated by the arrow in the drawing) at the surface of the liquid crystal display panel PNL where the spacers SP are not disposed, and along each side configuring the outer contour of the effective display region AR.

The light-shielding tape SLT is disposed at the portions where the spacers SP are not provided because the spacers SP positioned between the frames and the liquid crystal display panel PNL include the function of suppressing external stress with respect to the liquid crystal display panel PNL and also include the function of shielding the light from the backlight.

Figure 8B:
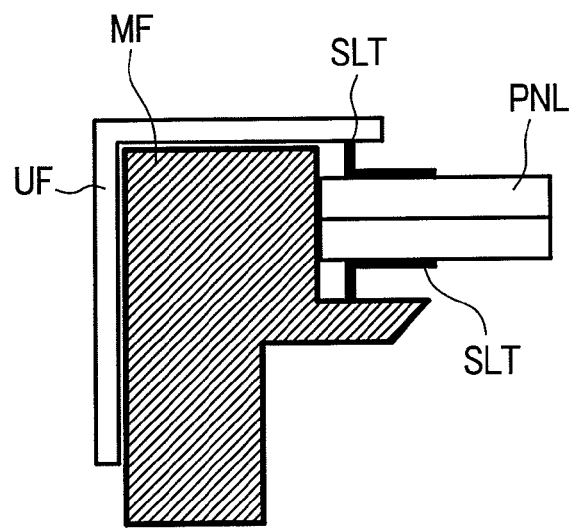
FIG. 8B is a cross-section taken along line A-A of FIG. 8A.

Also, as shown in FIG. 8B, which shows a cross-section taken along line A-A of FIG. 8A, the light-shielding tape SLT blocks the gap between the liquid crystal display panel PNL and the upper frame UF and the gap between the liquid crystal display panel PNL and the mold frame MF. The light-shielding tape SLT is formed in this manner at the portions where the spacers are not provided because the spacers SP interposed between the frames and the liquid crystal display panel PNL have the function of preventing the intrusion of dust from the outside.

It goes without saying that, in each of the preceding embodiments, the portions of the spacers SP at which the hardness is low, or where the relatively narrowly formed portions of the spacers SP are located, may be made into portions where no spacers are disposed and the light-shielding tape SLT may be disposed, as in this embodiment.

Also, in this embodiment, although intermittent spacers are disposed between the liquid crystal display panel PNL and the upper frame UF and between the liquid crystal display panel PNL and the mold frame MF, spacers such as those described in each of the preceding embodiments, or spacers whose hardness and width are uniform along the longitudinal direction, may be used between the liquid crystal display panel PNL and the upper frame UF or between the liquid crystal display panel PNL and the mold frame MF.

The various structural features of the preceding embodiments may be individually or used in combination. This is because the respective effects of the embodiments can be exhibited individually or together.

According to the display device which has been described in detail in conjunction with the embodiments, by varying the hardness of the elastic spacers along the longitudinal direction thereof, the transmission of a force from the frames to the liquid crystal display panel can be suppressed, whereby the force on the display panel can be made uniform and warping of the display panel can be significantly reduced.

When the hardness of the spacers is low, the spacers become that much easier to deform, and it becomes easy to avoid warping resulting from the force from the frames on the liquid crystal display panel at those portions due to the deformation. This is because, in this case, in light of the fact that the force transmitted from the frames to the liquid crystal display panel differs between the center portion and the side portions at one side portion of the liquid crystal display panel, the elastic spacers are tripartitioned in the longitudinal direction and the hardness is varied between the centers and sides thereof, whereby it becomes easier to allow the stress to escape.

Also, the characteristics of the material itself may also be varied as a means to vary the hardness of the spacers along the longitudinal direction thereof. Also, without changing a property of the material, even changing the width of the spacers can easily change the hardness (ease of deformation with respect to stress) so that the spacers can be easy to manufacture and can be easily applied.

The invention claimed is:

1. A display device comprising:
   a display panel;
   a first frame and a second frame; and
   a first elastic spacer and a second elastic spacer arranged on a peripheral portion of a first surface and a second surface the display panel, respectively, so as to extend in parallel to one another with respect to the peripheral portion of the display panel, the first elastic spacer being arranged between the first surface of the display panel and the first frame, and the second elastic spacer being arranged between the second surface of the display panel and the second frame;
   wherein a hardness of at least one of the first elastic spacer and the second elastic spacer varies along an elongated direction of the at least one of the first elastic spacer and the second electric spacer;
   wherein the hardness of the first elastic spacer varies along the elongated direction of the first elastic spacer, and the second elastic spacer is arranged in parallel to correspond in location to the first elastic spacer, and the hardness of a first portion of the second elastic spacer which corresponds in location to a high-hardness portion of the first elastic spacer is low, and the hardness of a second portion of the second elastic spacer which corresponds in location to a low-hardness portion of the first elastic spacer is high.

2. A display device according to claim 1, wherein at least one of the first elastic spacer and the second elastic spacer has a center portion and an end portion along the elongated direction, and the hardness of the center portion and the hardness of the end portion thereof are different.

3. A display device according to claim 1, wherein the first elastic spacer and the second elastic spacer each have a center portion and an end portion along the elongated direction, and the hardness of the center portion and the hardness of the end portion thereof is different.

4. A display device according to claim 1, wherein the hardness of the first elastic spacer and the hardness of the second elastic spacer are substantially equal at a corner portion of the peripheral portion of the display panel.

5. A display device according to claim 1, wherein the first frame includes a portion overlying the peripheral portion of the first surface of the display panel and the second frame includes a portion overlying the peripheral portion of the second surface of the display panel, the first elastic spacer being arranged between the portion of the first frame and the peripheral portion of the first surface of the display panel and the second elastic spacer being arranged between the portion of the second frame and the peripheral portion of the second surface of the display panel.

* * * * *